United States Patent [19]

Takematsu

[11] 4,379,983
[45] Apr. 12, 1983

[54] ELECTRIC FLASH DEVICE

[75] Inventor: Yoshiyuki Takematsu, Tokyo, Japan

[73] Assignee: Fuji Koeki Corporation, Tokyo, Japan

[21] Appl. No.: 239,619

[22] Filed: Mar. 2, 1981

[30] Foreign Application Priority Data

May 26, 1980 [JP] Japan ................................. 55-69874

[51] Int. Cl.³ ............................................ H05B 41/32
[52] U.S. Cl. .................................... 315/151; 315/133; 315/134; 354/33; 354/60 L; 354/128; 354/145
[58] Field of Search ............................... 315/133–136, 315/151, 159, 241 P; 354/32–34, 38, 60 E, 60 L, 127, 128, 139, 145

[56] References Cited

U.S. PATENT DOCUMENTS

| | | | |
|---|---|---|---|
| 4,198,141 | 4/1980 | Tominaga et al. | 354/60 L X |
| 4,258,991 | 3/1981 | Kuraishi | 354/128 X |
| 4,259,615 | 3/1981 | Kashihara et al. | 315/133 X |
| 4,294,528 | 10/1981 | Ohta et al. | 354/33 |
| 4,306,176 | 12/1981 | Kaneko et al. | 315/151 X |

Primary Examiner—Eugene R. La Roche
Attorney, Agent, or Firm—Fleit, Jacobson & Cohn

[57] ABSTRACT

A flash device of the invention comprises, substantially, a flash unit for generating flash light and a flash control unit for controlling the flash light generated from said flash unit. The flash unit comprises electric power supplying means for supplying electric power, electric energy storing means for storing the electric energy supplied from said electric power supplying means, flash light generating means for converting the electrical energy stored in said electric energy storing means to an optical energy, and said flash control unit comprises, substantially, light receiving means for receiving a reflecting light, flash light quantity detecting means for detecting flash light quantity, means for indicating light exposure quantity, and flash light quantity control means. The flash device of the present invention is convenient to adjust the photographing distance and a diaphragm of a camera in photographing.

14 Claims, 4 Drawing Figures

ELECTRIC FLASH DEVICE

FIELD OF THE INVENTION

The present invention relates to an electronic flash device, and more particularly to an electronic flash device which is used in an optical device such as a camera.

BACKGROUND OF THE INVENTION

In recent years, a flash device has been widely employed to an optical apparatus such as, for example, a camera. Particularly when the flash device is employed to the photographing, the light exposure is the most important component. In an automatic light adjusting device which is employed to the photographing the flash light is ceased, when the reflected light from an object to be photographed attains to a predetermined value.

The reflected light from the object to be photographed is, however, few in case that color of the object is black or in case that distance from the object to be photographed to the flash device is long, and the reflected light quantity is, therefore, few. By the few reflected light quantity, the automatic light adjusting device was inactivated, and thereby a photographer could not judge easily how to adjust the distance between the object to be photographed and the flash device or to adjust the diaphragm. To contrary, when the color of the object to be photographed is white, the reflected light quantity becomes much or the distance from the object to the flash device is very small, the reflected light quantity becomes large, and, accordingly, the automatic light adjusting device does not activate correctly. It is also impossible for the photographer how to alternate the distance or to adjust the diaphragm.

SUMMARY OF THE INVENTION

It is, accordingly, an object of the present invention to provide a high performance flash device which is able to confirm that the reflected light is controlled such that an exposure light quantity becomes to the preset value by means of detecting the reflected light which is produced by the flashing portion and is reflected from the object to be photographed, as well as is convenient to use.

According to the present invention, there is provided an electronic flash device comprising, substantially, means for storing an electrical energy by boosting and rectifying a power source voltage, trigger signal generating means, flash light generating means for generating flash light, flash light detecting means including a light receiving member, a reference voltage setting member, a comparator and a light quantity indicating member.

BRIEF DESCRIPTION OF THE DRAWING

The other objects and features of the present invention will be best understood by the description of the preferred embodiments when read in connection with the accompanying drawings.

DESCRIPTION OF THE PREFERRED EMBODIMENTS

Figure 1:
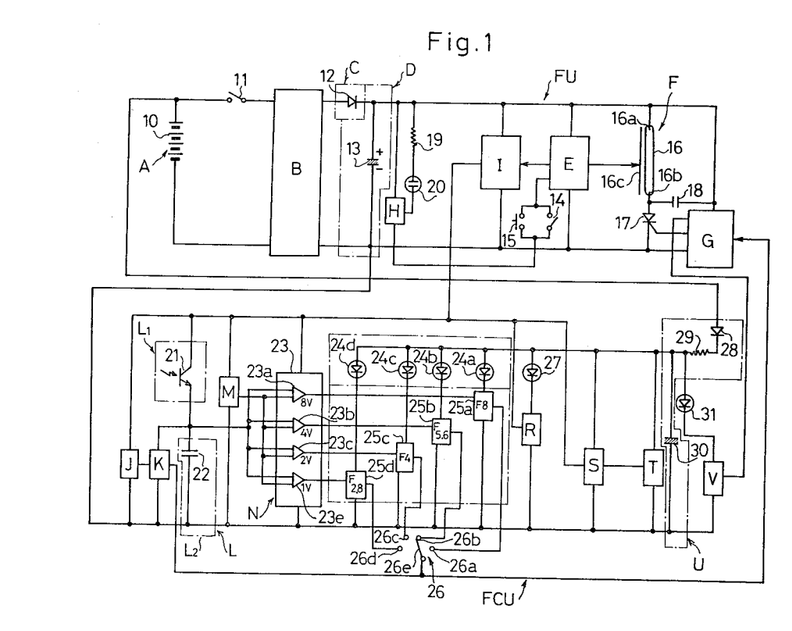
FIG. 1 is an electric diagram of an electronic flash device of the present invention.

Referring to FIG. 1 of the drawings, there is shown an electronic flash device according to the present invention. The electronic flash device has a flash unit FU for generating flash light and a flash control unit FCU for controlling the flash light generated from said flash unit FU.

The flash unit FU comprises, substantially, power supplying means for supplying electric power, electrical energy storing means for storing electrical energy supplied from said electric power supplying means, flash light generating means for converting the electric energy stored in said electric energy storing means to light energy, trigger signal generating means for triggering said flash light generating means, and flash light control means for controlling flash light quantity.

The electric power supplying means comprises, substantially, direct current power source including a low battery 10 and a power source switch connected to the battery 10, a voltage converter circuit B for converting and boosting a direct current voltage to an alternating current voltage, a rectifier circuit C including a diode 12.

The electric energy storing means comprises an electric energy storing circuit D for storing an electric charge and for supplying the electric energy to the flash light generating means. The flash light generating means comprises a flash tube circuit F for generating flash light. The trigger signal generating means comprises a trigger signal generating circuit E for actuating the flash tube circuit F. The flash light control means comprises a quenching controlling circuit G for controlling flashing operation of said flash tube circuit F, an indicating and trigger control circuit H for indicating that an electric charge is stored said electric energy is stored at a predetermined value and for controlling activation of said trigger signal generating circuit E, and a voltage generating circuit I activated by an activation signal and generating a voltage signal.

The flash control unit FCU comprises, substantially, a light receiving circuit $L_1$ for sensing a flash light generated from the flash tube circuit and thereafter generated from an object to be photographed (not shown in the drawing) and conducting in response to the reflected light quantity, an integration circuit $L_2$ in which the charging time interval changes corresponding to conduction of the light receiving circuit $L_1$, an integration reset circuit K for resetting the integration circuit $L_2$, a timing adjusting circuit M for adjusting the rest timing of the integration rest circuit K, a reference voltage setting circuit N for setting a plurality of reference voltage, an exposure light quantity detecting circuit in the form of a comparator circuit N receiving a voltage signal and a reference voltage signal of the reference voltage setting circuit M, an exposure indicating circuit P illuminating in response to an output of the comparator circuit N, an indication controlling circuit Q activated by a voltage signal supplied from the voltage generating circuit I, an actuation confirming circuit R actuating and rendering the indication controlling circuit Q to fire when the signal is supplied from the voltage generating circuit I of the flash unit FU, a timer circuit S for setting time interval of said indicating circuit P and an illumination resetting circuit T for resetting the illumination of the indicating members.

In more detail, the voltage converter circuit B has, substantially, an oscillator circuit and is connected to the battery 10 by way of the power source switch 11. The rectifier circuit C is connected to an output side of the voltage converter circuit B. The electric charge storing circuit D has a main storage capacitor 13, and the main storage capacitor 13 is connected to the voltage converter circuit B by way of the rectifier circuit C. The trigger signal generating circuit E has a triggering transformer and a trigger capacitor and so on, and activates when a synchronous switch 14 synchronizing with a camera shutter (not shown in the drawing) or a test button switch 15 is made ON state. The flash tube circuit F has a flash tube 16 and is connected to the main storage capacitor 13 in parallel relationship. The quench control circuit G is connected to a thyristor 17 by way of a commutation capacitor 18. The trigger control circuit H is connected to an electric charge indicating lamp in the form of a neon glow lamp 20 by way of a protecting resistor 19. The trigger control circuit H is activated by the illumination and controls the trigger signal generating circuit E. The voltage generating circuit I is activated by an input signal from the trigger signal generating circuit E and applies the voltage to the light receiving circuit $L_1$, the integration circuit $L_2$, the timing adjusting circuit J, the reference voltage setting circuit M, the comparator circuit N, the circuit R and the timer circuit S.

In the flash light control unit FCU, the timing adjusting circuit J adjusts the reset timing of the integrating circuit $L_2$. The discharging circuit K operates after a predetermined time interval when the flash tube 16 flashes and makes the integration circuit $L_2$ OFF. The light receiving circuit $L_1$ comprises a light sensitive element in the form of a phototransistor 21. The phototransistor 21 is connected to the integration capacitor 22. The reference voltage setting circuit M comprises, substantially, a plurality of voltage dividing resistor elements. The comparator circuit N, a plurality of comparators 23a, 23b, 23c and 23d, each of which is activated by different operation voltages such as, for example, 8 volts, 4 volts, 2 volts and 1 volt. The comparators are, respectively, connected to the integration circuit $L_1$ and the reference voltage setting circuit M. The indicating circuit P has a plurality of indicating elements in the form of light emitting diodes 24a, 24b, 24c and 24d. The indication controlling member Q comprises a plurality of switching circuits 25a, 25b, 25c and 25d connected to the light emitting diodes 24a, 24b, 24c and 24d which are, respectively, operated by the comparator elements 23a, 23b, 23c and 23d. The switching circuits 25a-25d of the indication controlling member Q are connected to the light emitting diodes 24a-24d, and is connected to the quench controlling circuit G of the flash unit FU by way of a changeover switch 26 and the indication controlling circuit Q is reset by the actuating signal of the quench controlling circuit G. An actuation confirming circuit R is connected to an indicating element in the form of a light emitting diode 27 to illuminate the diode 27 in response to the voltage signal from the voltage generating circuit I of the flash unit FU in activating of the flash unit FU. The timer circuit S and the indication reset circuit T are, respectively, connected to the indicating circuit P, the indication controlling circuit Q and the actuation indicating circuit R in parallel relationship. The timer circuit T is activated by a signal from the voltage signal from the voltage generating circuit I. The indication reset circuit T is activated by a time up signal from the timer circuit S and distinguishes the light emitting diodes 24a-24d of the indicating circuit and the light emitting diodes 27. The smoothing circuit U comprises a diode 28 connected to the battery 10 of the direct current power source circuit A, and a smoothing capacitor 30 connected between the diode 28 and the battery 10 by way of a protecting resistor 29. The quench detecting circuit is connected to a light emitting diode 31 and the quench controlling circuit G.

The electronic flash device constructed as is foregoing description operates as follows.

When the power source switch is closed, the voltage converter circuit B activates an oscillating operation, and thereby the high voltage is induced, and the boosted alternating current voltage is rectified by the rectifier circuit C, and thereafter electric charge is stored on the main storage capacitor 13 of the electric energy storing circuit D. When the main storage capacitor 13 is charged to the predetermined voltage, the neon glow lamp 20 lights indicating that the device is readiness for the flash tube 16 to be fired and, further, the trigger controlling circuit H operates and generates a control voltage. Under these conditions, the trigger signal generating circuit E activates to generate a trigger signal by the operation of the test button switch 15 or the synchronous switch 14 which is operated in synchronism with the camera shutter opening operation, enabling flash tube 16 of the flash tube circuit F to be flashed. When the trigger signal generating circuit E activates, a control signal is supplied to the voltage generating circuit I. The voltage generating circuit I is activated in synchronism with the flash operation of the flash tube 16 by the control signal from the trigger signal generating circuit E.

By the activation of the voltage generating circuit I, a control voltage is supplied to the flash control unit FCU as a power source voltage of the timing adjusting circuit J, the discharging circuit K, the light receiving circuit $L_1$, the integration circuit $L_2$, the reference voltage setting circuit M, the comparator circuit N, the indication resetting circuit R and the timer circuit S. The voltage smoothing circuit U smoothes the power source voltage applied from the battery 10 of the direct current power source circuit A by way of the diode 28 and the protecting resistor 29. The smoothed voltage by the voltage smoothing circuit U is applied to the indicating circuit P and the indication controlling circuit Q.

Under these conditions, the flash light produced by the flash tube 16 illuminates the object to be photographed and thereafter reflects from the object. The phototransistor 21 of the light receiving circuit $L_1$ receives and senses the reflected flash light from the object to be photographed. The phototransistor 21 becomes conductive in response to the emitting light quantity. By the conduction of the phototransistor 21, the electric charge is stored on the integrating capacitor 22 of the integrating circuit $L_2$ in response to the conducting degree of the phototransistor 21. The charging voltage of the integration capacitor 22 is applied to the comparator circuit N and, at the same time, the reference voltages are also applied to the comparator circuit N from the reference voltage setting circuit M.

The comparator circuit N comprises a plurality of comparator elements 23a, 23b, 23c and 23d. In this case, an actuating voltage of the comparator element 23a is set to such as, for example, 8 volts, an actuating voltage of the element 23b to 4 volts, an actuating voltage of the element 23c to 2 volts, and an actuating voltage is set to 1 volt. The setting voltages of the reference voltage setting circuit M are also set to the corresponding voltage of the comparator elements 23a–23d. When the charging voltage of the integrating capacitor 22 is 4 volts, the comparator elements 23b, 23c and 23d activate, since the electric charge is stored on the integrating capacitor 22 corresponding to the light quantity of the reflected light. The indication controlling circuits 23b–25d is operated by the outputs signals from the comparator circuit N, and thereby the indicating elements 24b–24d illuminate to indicate the flash light quantity of the flash tube 16. In this case, the indication controlling member 25b is set so as to operate when the light quantity is corresponded to the diaphragm value F=5.6, the member 25c is corresponded to the diaphragm value F=4, the member 25d is corresponded to the diaphragm value F=2.8.

As is shown in FIG. 1, the movable contact 26e is connected to the indication controlling member 25b by way of the stationary contact 26b. When the voltage signal of which value is 4 volts is supplied to the comparator 23, the comparator elements 23b–23d activate to illuminate the light emitting diodes 24b–24d. Under these conditions, output signal of the comparator element 23b is supplied to the quench controlling circuit G by way of the changeover switch 26, and thereby the thyristor 17 is made nonconductive. By turning the thyristor 17, the flash tube 16 ceases flashing. When the reflected light quantity is few and the integrating value of the integration capacitor 22 is less than the diaphragm value F=5.6, the indication controlling circuits 25c and 25d activate to fire both of the light emitting diode 24c and 24d, or 25d activates to fire the only diode 25d. By the illuminating state of the light emitting diodes 24b–24d, the photographer can easily confirm that the quantity of the light of the flash tube 16 did not attain to the light quantity which corresponds to the diaphragm value F=5.6, as well as can be confirmed the inadequate quantity of the light generated in the flash tube 16. In thus manner, when the inadequate light quantity with respect to the preselected value is detected, the photographer can make the camera-object distance small or adjust the diaphragm value of the camera in order to obtain the suitable light exposure.

When the reference voltage value of the reference voltage setting circuit M becomes lower than the voltage value of the integration capacitor 22, the comparator N operates to fail. Accordingly, the voltage of the integrating circuit $L_2$ is forcibly lowered by means of operating the $L_2$ after the predetermined time interval when the voltage signal is generated from the voltage generating circuit I by using the timing adjusting circuit J. Further, when another light such as, for example, the sun light emits to the light receiving circit $L_1$, the charging voltage of the integration capacitor 22 becomes higher than the reference voltage of the reference voltage setting circuit M, the comparator circuit N operates erroneously. To prevent the error operation, the electric charge of the integration capacitor 22 is made zero by discharging the electric charge of the integration capacitor 22 to make the charging voltage low by the operation of the discharging circuit K. The discharging circuit K is operated by means of supplying the output signal of the illumination controlling circuit Q by way of the changeover switch 26 when the illumination controlling circuit activates its operation.

The actuation confirming and detecting circuit R for detecting the flash unit FU operates when the voltage signal is supplied to the circuit R from the voltage generating circuit I. By the operation of the actuation confirming and detecting circuit R, the light emitting diode 27 is fired to be illuminated. By the illumination of the light emitting diode 27, the operation of the flash unit FU can be confirmed. When the only light emitting diode 27 illuminates and all of the other light emitting diodes 24a–24d do not illuminate, the photographer can confirm that the flash light of the flash tube 16 is the under exposure.

The timer circuit S is also operated by the voltage signal supplied from the voltage generating circuit I. When the timer circuit S is activated by the voltage signal from the voltage generating circuit I, the pulse signal is supplied from the timer circuit S to the illumination resetting circuit T, after the preset time of the timer circuit S such as 3 seconds. By the application of the pulse signal from the timer circuit S to the illumination resetting circuit T, the circuit T operates to short-circuit the electric power to be supplied to the light emitting diodes 24a–24d and 27, and thereby the illumination of the light emitting diodes 24a–24d and 27 are reset to be distinguished.

Additionally, the operation of the quench controlling circuit G can be detected and confirmed by the illumination of the light emitting diode 31, since the quench detecting circuit V is operated by a signal from the circuit G and the diode 31 is fired by the operation of the circuit V. The diode 31 is distinguished by the operation of the illumination resetting circuit T.

Figure 2:
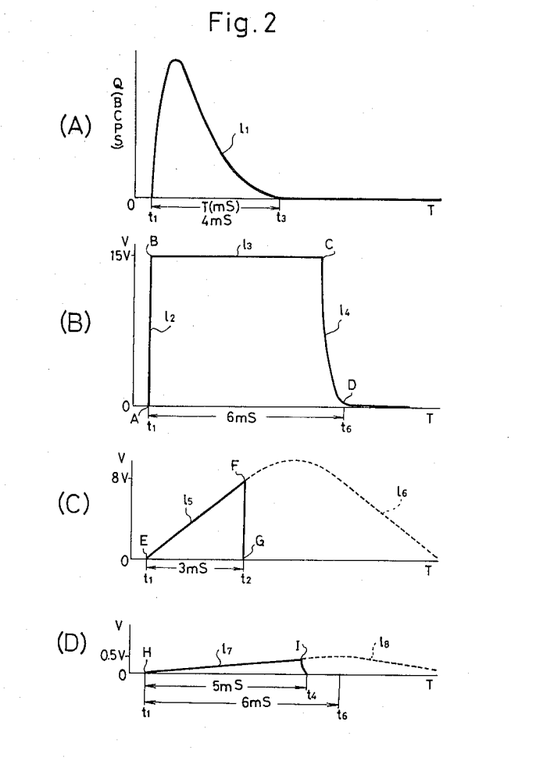
FIGS. 2A to 2D are, respectively, operating characteristic curves of the flash device of FIG. 1.

FIGS. 2A to 2D are representative of the operating characteristics of the flash device of FIG. 1. As is best shown by a curve $l_1$ of FIG. 2A, it should be assumed that the flash tube 16 flashes at the time point $t_1$ after the switch 14 or 15 is closed and ceases to flash after such as 4 millisecond at the time point $t_3$ from the commencement of the flashing of the flash tube 16. When the flash tube 16 begins to flash operation, the voltage generating circuit I produces the voltage at the point A as is shown in FIG. 2B which corresponds to the time point $t_1$ as is shown by a curve $l_2$, the produced voltage from the voltage generating circuit I is boosted up to 15 volts (point B). The boosted voltage is maintained during the given time interval such as, for example, about 5 millisecond as shown by the points B and C of a curve $l_3$ of FIG. 2B, and is, thereafter, damped as is shown by points C and D of a curve $l_4$. In this case, when the integration capacitor 21 is made conductive in response to the reflected light quantity of reflecting light from the object to be photographed, the electric charge is stored on the capacitor 21 as is shown by $l_5$ of FIG. 2C.

Under these conditions, an electric charge is also stored on the K as is shown by $l_5$ of FIG. 2C during the time duration $t_1 - t_2$ shown by from a points E to F, and thereafter the charging voltage of the 22 becomes approximately 8 volts. When the charging voltage attains to the predetermined value as is shown by such as the point E of the curve $l_6$, the comparator circuit N activates in order to operate the Q. The output signal of the Q is supplied from the G and K by way of the 26. By the signal supplied from the Q, the G activates to stop the flash operation of the 16 at the approximately same timing shown by the point E of FIG. 2C. In this case, the charging voltage of the capacitor 22 decreases and becomes zero as is shown by the points E and G by the conduction of the circuit K, since the electric signal is supplied to the circuit K by way of 26. To the contrary, the charging voltage of the capacitor 22 becomes higher than 8 volts as is shown by $l_6$ of FIG. 2C, when the circuit K is not activated and thereby the electric charge of the integration capacitor 22 is not discharged. In this case, when the voltage of the voltage generating circuit I shown by $l_4$ becomes lower than that of the capacitor 22 shown by the $l_6$, the comparator circuit N operates erroneously. To prevent the erroneous operation of the comparator N, the charging voltage of the capacitor 22 is made zero by means of the ON operation of the circuit K after the elapse of three seconds as is shown by the points E and G of the curve $l_5$.

FIG. 2D shows a charging state of the integration capacitor 22 due to another emitting light. In this case, the charging voltage of the capacitor 22 decreases from a value corresponding to the point I to a value which corresponds to the point J, and the charging voltage of the integration capacitor 22 becomes zero.

Although the electric charge of the capacitor 22 is made zero by short-circuiting the capacitor 22 after the predetermined time interval by adjusting the operation timing by means of the circuit J, the timing adjusting circuit J can be made conductive after the predetermined time interval such as, for example, 5 ms from the point B by employing a timer element, as is shown in FIG. 2B.

As is apparent from the foregoing description, the device of the first embodiment can perform the confirmation of the automatic light exposure control and the confirmation of conditions of the light exposuring quantity of the device. Accordingly, the device is very convenient to alternate the photographing distance and to adjust the diaphragm of the camera.

Figure 3:
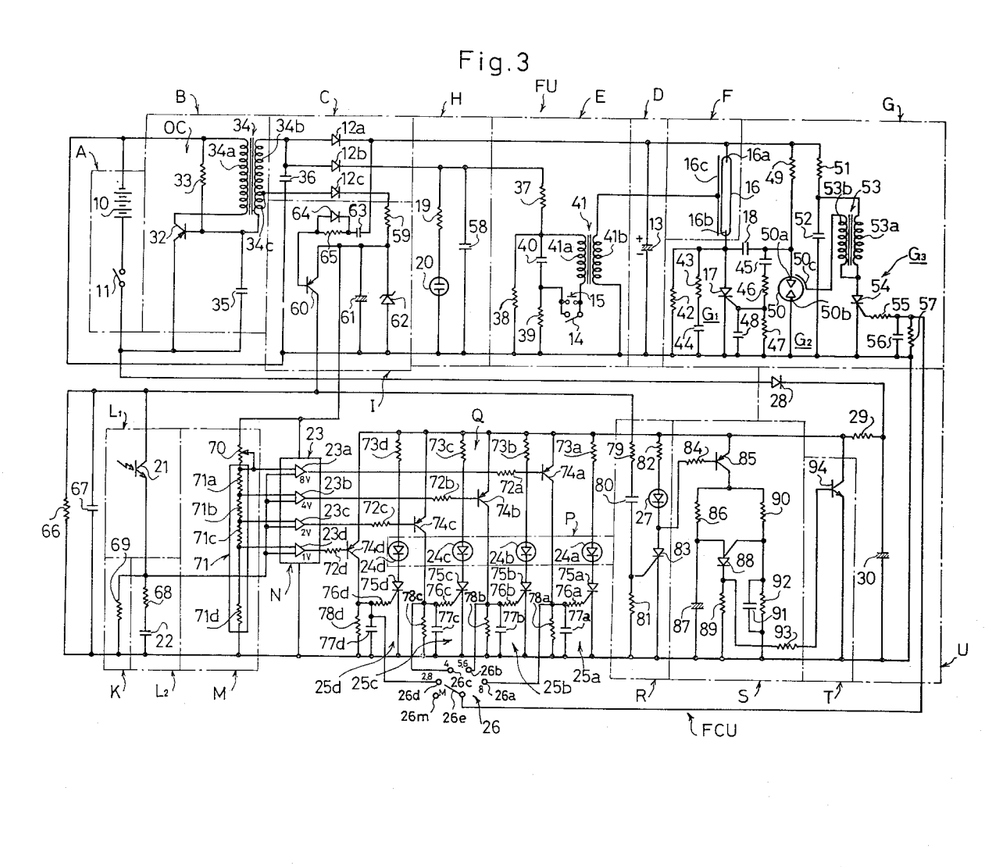
FIG. 3 is an electronic diagram of an electronic flash device of the present invention.

FIG. 3 shows the second embodiment of the flash device in accordance with the present invention. According to the flash device shown in FIG. 3, a voltage converter circuit B comprises, substantially, an oscillator circuit OC. In more detail, the voltage converter circuit B includes a switch element in the form of a transistor 32 of which emitter electrode is connected to a positive terminal of a battery 10 by way of a power source switch 11, an oscillating transformer 34 including a primary coil 34a connected to the battery 10 by way of the collector-emitter path of the transistor 32 and the power source switch 11, a resistor 33 between a positive terminal and a base electrode of the transistor 32, and an oscillating capacitor 35 connected between the emitter electrode and the base electrode of the transistor 32. One terminal of a secondary winding 34b is connected to the base electrode of the transistor 32. The rectifier circuit C comprises diodes 12a, 12b, 12c and a capacitor 36. Anode electrodes of the diodes 12a and 12b are connected to a terminal of the secondary coil 34b, and an anode electrode of the diode 12c is connected to a tap 34c of the secondary coil 34b. The capacitor 36 is connected between the secondary coil 34b and the negative terminal of the battery 10.

An electric energy storing circuit D has a main storage capacitor 13 which is connected to the diode 12a of the rectifier circuit C and the negative terminal of the battery 10. A trigger signal generating circuit E comprises resistors 37, 38 and 39, a first trigger capacitor 40 and a first triggering transformer 41. The resistors 37 and 39 and the trigger capacitor 40 are connected between the diode 12b and the negative terminal of the battery 10, and the resistor 38 is connected to the trigger capacitor 40 and the resistor 39 in parallel relationship in order to be used as a by-passing resistor of the trigger capacitor 40. A primary coil 41a of the triggering transformer 41 is connected in parallel to the trigger capacitor 40 by way of a synchronous switch 41 and a test button switch 15. A flash tube circuit F has a flash tube 16 of which main current conducting electrodes 16a is connected to the diode 12a of the rectifier circuit C and a trigger electrode 16c is connected to a secondary coil 41b of the first triggering transformer 41.

A quench controlling circuit G comprises a switching circuit $G_1$ controlling the flash tube circuit F, a quenching circuit $G_2$ for controlling the switching circuit $G_1$, and a quenching signal generating circuit $G_3$ for triggering the quench tube circuit $G_2$. The switching circuit $G_1$ comprises a first switching element in the form of a thyristor 17, a commutation resistor 18, a commutation resistor 42, a resistor 43, capacitors 44, 45 and 48, and resistors 46 and 47 and is connected as shown. The quenching circuit $G_2$ includes a protecting resistor 49 and a quench tube 50 having a pair of main current conducting electrodes 50a and 50b and a trigger electrode 50c. The quench tube 50 is also connected to both electrodes 16a and 16b of the flash tube 16 and the main storage capacitor 16. The quench controlling circuit $G_3$ includes a protecting resistor 51, a second trigger capacitor 52 and a second triggering capacitor 52. The trigger capacitor 52 is connected between the diode 12a of the rectifier circuit C and the negative terminal of the battery 10 of the direct current power source circuit A. A primary coil 53a of the second triggering transformer 53 is connected to the trigger capacitor 52 by way of a second thyristor 54. Connected to a gate electrode of the thyristor 54 is a protecting resistor 55, a capacitor 56 for absorbing the noise, and a resistor 57.

In a trigger controlling and indicating circuit H, an indicating element in the form of a neon glow lamp 20 is connected to the smoothing capacitor 58 by way of a protecting resistor 19. A voltage generating circuit I comprises a switch element in the form of a transistor 60 of which an emitter electrode is connected to the diode 12a of the rectifier circuit C, a constant voltage generating element in the form of a Zener diode 62 connected between the diode 12c of the rectifier circuit C and the negative terminal of the battery 10, and a smoothing capacitor 62. A base electrode of the transistor 60 is connected to the diode 12a by way of a bias controlling member which comprises a diode 64, a resistor 65 and a capacitor 63. A collector electrode of the transistor 60 is connected to a load resistor 66, a capacitor 67, a light receiving circuit $L_1$ and a flash operation confirming and detecting circuit R of a flash control unit FCU.

In the flash control unit FCU, a light sensing element in the form of a phototransistor 21 is connected to a resistor 58 and an integrating capacitor 52, and a resistor 69 is connected to the resistor 68 and the capacitor 69 forming a discharging circuit K. The integration circuit $L_2$ comprises the resistor 68 and the integrating capacitor 22. A reference voltage setting circuit M has a voltage divider 71 which is connected to the collector electrode of the transistor 60 of the voltage generating circuit I by way of a variable resistor 70. The voltage divider 71 has a plurality of series connected resistor element 71a, 71b, 71c and 71d.

A comparator circuit N comprises a plurality of comparator element 23a, 23b, 23c and 23d. Each of the comparator elements 23a–23d is set so as to operate the different setting voltage, and is connected to corresponding taps of the resistor elements 71a–71d of the voltage divider 71 and the integration circuit $L_2$ and the discharging circuit K. Each of light emitting diodes 24a–24d is connected to a corresponding switching control circuit 25a–25d of an indication controlling circuit Q. In the indication controlling circuit Q, each of transistors 74a–74d is connected to the corresponding comparator element of the comparator circuit N by way of resistors 72a–72d. The protecting resistors 73a–73d are connected, respectively, to thyristors 75a–75d by way of the light emitting diodes 24a–24d. A changeover switch 26 is used to change the quantity of the flash light generated from the flash tube 16. The changeover switch 26 comprises a movable contact 26e, a manual operation setting contact 26m and a plurality of stationary contacts 26a, 26b, 26c and 26d. In more detail, the contact 26a is corresponded to the F-number 8, the contact 26b is corresponded to F-number 4, the contact 26c to F-number 2 and the contact 26d is corresponded to F-number 1. The changeover switch 26 is connected to the thyristor 54 by way of a protecting resistor 55. In thus manner, to set the diaphragm of the camera to a predetermined value means that the light quantity of the flash tube 16 is adjusted and thereby the suitable light exposure quantity can be obtained. The transistor 60 is connected to a resistor 81 and a capacitor 79 and a capacitor 80, and a thyristor 83 is connected to a protecting resistor 82 by way of a resistor 82. The light emitting diode 27 and the thyristor 83 is connected to a transistor 85 by way of a resistor 84. The transistor 85 is connected to a programmable unijunction transistor 88 by way of a resistor 86 and a resistor 90, and the transistor 88 is connected to an integration capacitor 87 for adjusting delay time, a resistor 87, a resistor 89, a capacitor 91 and a resistor 92. The transistor 88 and the protecting resistor 89 are connected to a transistor 94 through a protecting resistor 94. The transistor 94 is connected to a diode 28 and a smoothing capacitor by way of a protecting resistor 29 and the diode 28 is connected to the battery 10 by way of the power source switch 11.

In operation, when the power source switch 11 is closed, the voltage converter circuit B activates an oscillating operation, and thereby the high voltage is induced at the secondary coil 34b of the oscillating transformer 34. The boosted alternating current voltage is rectified by the rectifier circuit C, and thereafter electric charge is stored on the main storage capacitor 13. When the main storage capacitor 13 is charged to the predetermined voltage, the neon glow lamp 20 lights indicating that the device is readiness for the flash tube 16 to be fired. Simultaneously, the triggering capacitors 40 and 52 are charged by the high D.C. voltage from the rectifier circuit C. In such conditions, the operation of the flash tube circuit F is initiated by the flash operation of the trigger signal generating circuit E in synchronism with the camera shutter opening operation, enabling flash tube 16 to be flashed.

In more detail, the direct current voltage rectified by the diode 12a of the rectifier circuit C is applied to the main storage capacitor 13, and the charging voltage of the main storage capacitor 13 is gradually increased. With the increment of the main storage capacitor 13, the charging voltage of the capacitor 58 is also increased by the application of the rectified voltage from the diode 12b. A direct current voltage rectified by the diode 12c is applied to the Zener diode 62 of the voltage generating circuit I to produce a constant voltage, and thereby the charging voltage of the capacitor 62 is made constant. The tap 34c of the transformer 34 is provided in order to obtain the relatively low voltage such as about 15 to 20 volts the transistor 60 is biased to be nonconductive by the application of positive voltage of the charging voltage of the capacitor 63. In such condition, the charging voltage of the capacitor 61 is always applied to the comparator circuit N of the flash control unit FCU, and therefore the comparator circuit N is set to be operable in any time.

When the flash tube circuit F operates, the electric charge of the capacitor 63 in the voltage generating circuit I is discharged toward the flash tube 16. By the discharge of the capacitor 63, a negative voltage is applied to the base electrode of the transistor 60 to make it conductive. When the transistor 60 is made conductive, a terminal voltage of the capacitor 61 of the voltage generating circuit I is applied to the light receiving circuit $L_1$, the reference voltage setting circuit M and the actuation confirming circuit R. Under these conditions, the phototransistor 21 of the light receiving circuit $L_1$ senses the reflecting flash light of the flash light produced by the flash tube 16 and becomes conductive in response to the quantity of the reflecting light. By the conduction of the phototransistor 21, electric charge is stored on the integration capacitor 22 of the integrating circuit $L_2$ and thereby the charging voltage of the integration capacitor 22 increases to a predetermined value which is corresponded to quantity of the flash light. The charging voltage of the integration capacitor 22 is applied to the comparator circuit N. On the other hand, the reference voltage setting circuit M produces a plurality of reference voltages to be applied to the comparator circuit N. In this instance, the reference voltage M is set so as to produce the plurality of reference voltages such as, for example, 8 V, 4 V, 2 V and 1 V. The comparator circuit N is composed by the comparator element 23a activated by operating voltage of 8 V, the element 23b operated at 4 V, the element 23c operated at 2 V and the comparator element operated at 1 V.

When the charging voltage of the integration capacitor 22 attains the predetermined value such as 8 volts, all of the comparator elements 23a, 23b, 23c and 24d are activated and output signals. By these output signals, all of the transistor 74a, 74b, 74c and 74d become conductive. When the transistors 74a–74d becomes conductive, gate signals are supplied to the thyristors 75a, 75b, 75c and 75d, enabling the thyristors to be conductive. By the conduction of the thyristors 74a–74d of the illumination controlling circuit Q, all of the light emitting diodes 24a, 24b, 24c and 24d light and indicate the light quantity of the flash light generated from the flash tube 16 of the flash tube circuit F. In the same manner, at least one of the light emitting diodes 24a–24d of the indicating circuit P lights and indicating the flash light quantity in accordance with the charging voltage value of the integration capacitor 22 of the integrating circuit $L_2$. Namely, when the charging voltage of the capacitor 22 is 4 volts, the diodes 24b, 24c and 24d light indicating the corresponding light quantity. When the charging voltage of the capacitor 22 attains to 2 volts the diodes 24c and 24d light and, when the voltage of the capacitor 22 attains to 1 volt, the diode 24d lights and indicating the corresponding light quantity of the flash light produced by the flash tube 16.

Although the indication controlling circuit Q is designed so as to be operated by the output signal of the comparator circuit N in the flash device shown in the drawings, in accordance with the present invention, an external and another indication control unit may be used instead of the indication controlling circuit Q.

In the flash device shown in FIG. 3, when the distance between the object to be photographed and the flash device is small in photographing, the integrating operation of the integrating circuit $L_2$ is fastened by the resistor 68, and the charging voltage of the integration capacitor 22 is by-passed by the resistor 69 of the discharging circuit K.

The output signal of the comparator circuit N is also supplied to the quench controlling circuit G by way of the changeover switch 26. The quench controlling circuit G controls the flash timing and the flashing time duration of the flash tube 16 in accordance with the control signal from the comparator circuit N. In more detail, if the movable contact 26e is connected to the stationary contact 26d which corresponds to the element 23d of the comparator circuit N, the output signal of the element 23d is supplied to the quench controlling circuit G when the integrated voltage of the integration capacitor becomes more than at least 1 volt. By the control signal from the comparator circuit N, the thyristor 54 is triggered to be conductive. When the thyristor 54 is turned ON, the electric charge of the second triggering capacitor 52 is discharged by way of the primary coil 53a of the second triggering transformer 53 and the thyristor 54. A high voltage pulse is produced at the secondary coil 53b as a trigger signal of the quench tube 50.

There are, of course, certain criteria that must be met in quench tube 50. To operate effectively, the quench tube 50 must have a low impedance compared with the flash tube 16. The flash tube 16 has a minimum impedance of typically 1.5 to 2 ohms. Thus, the quench tube 50 should have an impedance near 0.1 ohm. To provide such low impedance, the quench tube 50 also should have a low gas pressure and a small electrode spacing. The electrode 50a and 50b must be capable of carrying a very high current for short time. The quench tube 50 must be capable of being triggered rapidly and easily into conduction over the range of voltage change across the flash tube during the flash. The quench tube 50 includes a trigger electrode 50c spaced midway between the two main electrodes 50a and 50b.

By the trigger signal supplied from the triggering transformer 53, the quench tube 50, the quench tube 50 of the quenching circuit $G_2$ is activated to be conductive. When the quench tube 50 becomes conductive, the discharging current from the main storage capacitor 13 of the electric energy storing circuit D is by-passed by the quench tube 50 to stop the flash operation of the flash tube 16 of the flash tube circuit F, because the internal resistance of the quench tube 50 is smaller than that of the flash tube 16.

When the flash tube 16 stops flashing, the quantity of the flash light becomes zero and the light emitting diode 24d is distinguished because the comparator circuit N ceases the operation. When the distance between the object and the flash unit is very short, the superabundant light is generated from the flash tube 16 in spite of stopping of the flash operation due to the delay of the activation of the quench controlling circuit G. Thus, the phototransistor 21 senses the unnecessary light, and thereby the unnecessary electric charge is stored on the integration capacitor 22. Accordingly, the light emitting diode 23c operates in addition to the diode 23d. In thus manner, the comparator circuit N is operated erroneously.

On the other hand, when the photographing distance is very long, the quantity of the reflecting light is few, and, therefore, few electric charge is stored on the integration capacitor 22. By the few charge stored on the capacitor, the charging voltage of the capacitor 22 becomes less than 1 volt, none of the light emitting diodes operate. In this case, the under exposure is detected and confirmed, since the firing signal is applied to the thyristor 83 of the actuation confirming circuit R from the voltage generating circuit I and thereby the thyristor 83 becomes conductive, and the diode 27 illuminate. When the changeover switch 26 is set to the manual operation, adequate quantity of the flash light can be confirmed if all light emitting diodes 24a–24d, although the control signal is not supplied to the quench controlling circuit G. When the thyristor 83 becomes conductive, the negative electric charge is applied to a base electrode of the transistor 85 of the timer circuit S, the transistor 85 becomes conductive. When the transistor 85 becomes ON, the programmable unijunction transistor 88 also becomes conductive. When the programmable unijunction transistor 88 of the timer S becomes conductive, an ON pulse signal is supplied to a base electrode of the transistor 94 and the transistor 94 is turned on. By the conduction of the transistor 94, all of the light emitting diodes are reset to be nonoperative.

Additionally, although the timing circuit means of the present embodiment is constructed such that the light emitting diodes 24a–24d and 27 are turned off after the given time interval, it is not always necessary for the light emitting diodes to be made turned off after the given time interval, but may be maintained by the immediately before the next flash operation of the flash tube circuit F. To perform this, it is possible to make the indication controlling circuit Q to be OFF state by the next flash operation in order to maintain the light emitting diodes.

Figure 4:
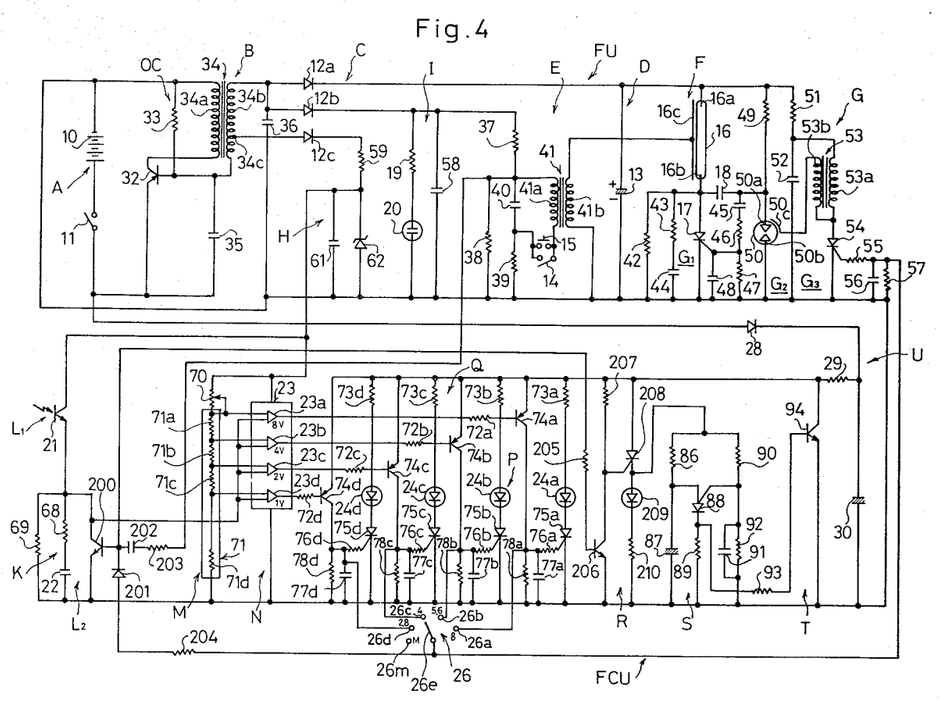
FIG. 4 is an electric diagram of an electronic flash device of a modification of the flash device shown in FIG. 3.

FIG. 4 shows a modification of the device of FIG. 3. In the device shown in FIG. 4, a discharging circuit K comprises a resistor 69 connected to the integrating circuit $L_2$ in parallel, a transistor 200 of which a collector-emitter path is connected to the integrating circuit $L_2$ so as to be in parallel relationship and a diode 201 connected between a base electrode of the transistor 200 and a gate electrode of a thyristor 54 of a quench controlling circuit M by way of a resistor 204 and a capacitor 202 connected between the base electrode of the transistor 200 and a voltage generating circuit I. An actuation confirming circuit R comprises a transistor 206 of which a collector-emitter path is connected to an indication resetting circuit T by way of a resistor 207 and a base electrode is connected to the base electrode of the transistor 200 by way of a resistor 205, series connected a thyristor 208, a light emitting diode 209 and a resistor 210.

In accordance with the device of FIG. 4, when a power source switch 11 is made ON, the voltage is applied continuously to a phototransistor 21 and a comparator circuit N. Accordingly, the integration capacitor 22 is by-passed and shortcircuited by the transistor 200 before the flash operation of a flash tube 16 in order to prevent the integration capacitor 22 from applying a signal from the phototransistor 21. The transistor 200 is made ON by the negative potential of the base electrode, when the flash tube 16 is not activated. When the flash tube 16 flashes, a negative voltage is applied to the base electrode of the transistor 200, and the transistor 200 is made nonconductive. When the transistor 200 becomes nonconductive, the electric charge is stored on the capacitor 200 to commence the integrating operation, and the comparator circuit N operates in accordance with the charging voltage of the integration capacitor 22.

In the circuit R, the transistor 206 is maintained to be conductive by the positive potential of the base electrode, when the flash tube 16 does not flash. When the flash tube 16 operates the flash operation, negative potential appears to the base electrode, and the transistor 206 becomes nonconductive. When the transistor 206 is nonconductive, the gate signal is supplied to the thyristor 208 through the resistor 207, and thereby the thyristor 208 is turned ON. By the conduction of the thyristor 208, the light emitting diode 209 lights and indicating the under exposure. When the thyristor 208 is conductive, current flows to capacitors 87 by way of a resistor 86, and the electric charge is stored on the capacitor 87. A transistor 88 becomes conductive when the electric charge of the capacitor 87 attains to a predetermined value after the predetermined time interval such as three seconds. When the transistor 88 is conductive, the voltage is applied to a transistor 94 by way of a resistor 93 to make the transistor 94 ON. When the transistor 94 is conductive, the light emitting diodes 24a–24d and 209 is reset to be distinguished. Control signals are supplied to the transistor 200 of the discharging circuit K and a thyristor 54 of a quench controlling circuit G from the comparator circuit N. By the control signal from the comparator circuit N, the transistor 200 is made conductive to short-circuit the capacitor 200 and, at the same time, the quench controlling circuit G activates in order to stop flash operation of the flash tube circuit F. In this case, the integrating circuit L₂ activates the normal operation, because the charging of the capacitor due to another light by the shortcircuit operation of the transistor 200.

In view of above, it will be seen that the several objects of the invention are achieved and other advantageous results are attained.

While a preferred embodiments of the invention has been shown and described, it will be apparent to those skilled in the art modifications can be made without departing from the principle and the spirit of the invention, the scope of which is defined in the appended claims. Accordingly, the foregoing embodiments are to be considered illustrative, rather than restricting of the invention and those modifications which come within the meaning and range of equivalency of the claims are to be included herein.

What is claimed is:

1. An electronic flash device comprising, in combination, a flash unit having electric power supply means including a direct current voltage power source, means for boosting voltage of said direct current power source and for storing electric energy, flash light generating member including a flash tube generating flash light, trigger signal generating means triggering said flash light generating member, and means for stopping flash of said flash light generating member when flash light quantity of said flash light attains to a predetermined value, and a flash control unit having light receiving means for receiving a reflecting light which is produced from said flash tube and is reflected from an object to be photographed, flash light quantity detecting means for detecting flash light quantity of said flash light generated from the flash tube by means of comparing an electric value obtained by integrating output of said light receiving means with reference voltage, means for indicating light exposure quantity in response to a plurality of outputs of said flash light quantity detecting means, and flash light quantity control means for controlling said flash light quantity of said flash light.

2. An electronic flash device comprising a flash unit having electric power supply means including a direct current voltage power source, means for boosting voltage of said direct current power source and for storing electric energy, flash light generating member including a flash tube generating flash light, trigger signal generating means triggering said flash light generating member, and means for stopping flash of said flash light generating member when flash light quantity of said flash light attains to a predetermined value, and a flash control unit having light receiving means for receiving a reflecting light which is produced from said flash tube and is reflected from an object to be photographed, flash light quantity detecting means for detecting flash light quantity of said flash light generated from the flash tube by means of comparing an electric value obtained by integrating output of said light receiving means with reference voltage, means for indicating light exposure quantity in response to a plurality of outputs of said flash light quantity detecting means, and flash light quantity control means for controlling said flash light quantity of said flash light, said flash unit further comprising a voltage generating member applying voltage to said light receiving means and said flash light quantity detecting means of the flash control unit, and said flash control unit further comprising means for maintaining operation of said indicating means during a predetermined time interval.

3. An electronic flash device as claimed in claim 1 wherein said power supply means further comprising a voltage converter circuit for boosting and converting an output voltage of said direct current power source to an alternating current voltage, a rectifier circuit for recrifying an alternating output of said voltage converter circuit, and electric energy storing circuit including a main storage capacitor for storing electric energy of a direct current voltage of said rectifier circuit as electric energy, and said means for stopping flash of the flash light generating member comprises a quench controlling circuit having a switching circuit turning on and off said flash tube of the flash light generating member, a quenching circuit for controlling said switching circuit, and a second trigger signal generating circuit.

4. An electronic flash device as claimed in claim 1 wherein said flash light quantity detecting means comprises a reference voltage setting circuit including a plurality of voltage dividing resistor, and a comparator circuit for receiving a plurality of reference voltage and charging voltage of an integration capacitor of said flash light quantity detecting means.

5. An electronic flash device as claimed in claim 1 wherein said indicator means comprises an indicating circuit lighting in response to output signals of said comparator circuit.

6. An electronic flash device as claimed in claim 5 wherein said indicating means further comprising an indication controlling circuit controlling said indicating circuit in response to the output signals of said comparator circuit.

7. An electronic flash device as claimed in claim 5 wherein said flash light quantity control means comprising a changeover switch connected to said comparator circuit and a quench controlling circuit connected to said changeover switch.

8. An electronic flash device as claimed in claim 2 wherein said voltage supply means comprises a voltage generating circuit activated by operation of said trigger signal generating means and generating a voltage signal.

9. An electronic flash device as claimed in claim 2 wherein said means for maintaining operation of said indicating means comprises a timer circuit generating OFF signal after a predetermined time interval at the time when the voltage generating circuit generates a voltage signal.

10. An electronic flash device as claimed in claim 2, further comprising an actuation confirming circuit for indicating the actuation of said flash unit.

11. An electronic flash device as claimed in claim 10, further comprising an indication resetting circuit for resetting an indicating circuit for indicating the flash light quantity of the flash member.

12. An electronic flash device as claimed in claim 3, further comprising a trigger controlling circuit activating only when a neon glow lamp lights.

13. An electronic flash device as claimed in claim 1, further comprising means for making the voltage of an integrating circuit of said light quantity detecting means approximately zero by feedbacking a flash stopping signal to said integrating circuit.

14. An electronic flash device as claimed in claim 1, further comprising means for making the voltage of an integrating circuit of said light quantity detecting means approximately zero after a predetermined time interval from a time point after flashing of said flash tube.

* * * * *